March 31, 1936.                C. CANTÉ                2,036,117
                        ELECTRIC HEATER FOR LIQUIDS
                           Filed Nov. 22, 1933
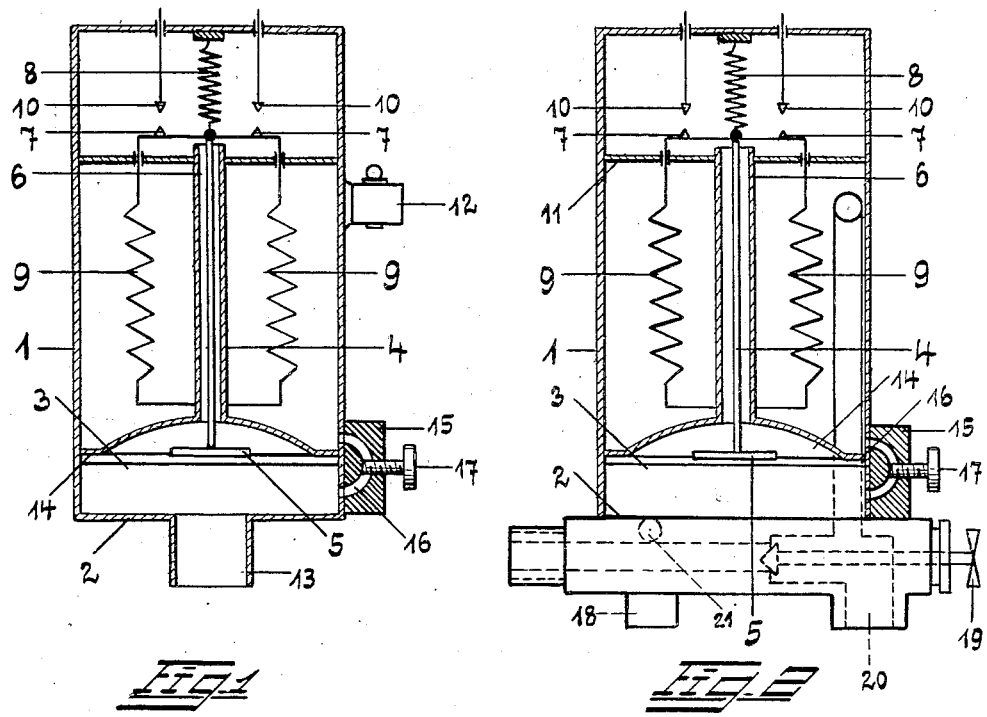
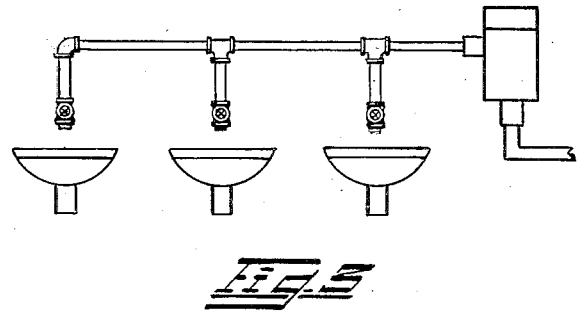
INVENTOR
CORNELIUS CANTÉ
By Chatwin & Company Attys.

Patented Mar. 31, 1936

2,036,117

UNITED STATES PATENT OFFICE 2,036,117

ELECTRIC HEATER FOR LIQUIDS

Cornelius Canté, Frankfort-on-the-Main, Germany

Application November 22, 1933, Serial No. 699,171
In Germany February 20, 1933

2 Claims. (Cl. 219—39)

The subject of the present invention is an electric heater for liquids.

There are already a number of forms of appliances in existence in which water is heated electrically when passing through them. These known devices are intended to be screwed onto the tap or else they are devices which are screwed on in place of the tap itself. Starting, that is switching on and turning on the water is done by hand. In other devices already known, however, these two operations are combined, the switching on and turning on of the water being positively inter-connected and operated by a single handle.

A drawback in all these devices is the fact that even if the water supply fails they can still be turned on and in that case as there is no cooling (water) in the body of the device they are overheated by the electric current, are damaged and are made useless. In the subject of the application, on the contrary the drawback described above is remedied in as much as the pressure of the water entering the device presses according to the invention against a diaphragm or a suitably guided piston with rod, and on movement of the latter effects the switching on of the electric current at the same time compressing a back-spring on the switch which on the stop valve being closed comes into operation and detaches the electric switch from its contact.

On the drawing the subject of the invention is illustrated namely:

Fig. 1 is a diagram of an electric liquid heater which can be mounted on a water tap.

Fig. 2 is a diagram of a modified form of Fig. 1, and

Fig. 3 is a diagram of an electric heater for liquid with three supply points for the heated water.

Inside a casing 1 made of metal a diaphragm 3 is fitted at a slight distance from the bottom 2. Above the diaphragm there is a sliding rod 4 the bottom end 5 of which is suitably widened. Against the top end of the said sliding rod 4, which can move inside a tubular guide 6 and which carries the two movable contactors 7 a back spring 8 presses. The above-mentioned movable contactors 7 which are connected with the electric heaters 9 are opposite contacts 10, the contact poles of the electric supply. The cover 11 forms the lid of the water container on the outer face of which a discharge socket or spout 12 which can be closed off by a valve is arranged, while the inlet pipe 13 for the cold water is in the bottom 2. The water chamber enclosed inside the casing 1 is divided by the diaphragm 3 or the enlarged end 14 of the tubular guide 6 into two parts, which can be connected with each other by a channel provided in the shoulder piece 16 of the casing 1, which is done by a screw or a valve 17. The electric liquid heater illustrated in Figure 2 only differs from the apparatus shown in Fig. 1 by the way the water is supplied. Thus the cold water enters the apparatus through the pipe 18, by means of valve 21, while the hot water or the hot and cold water mixed by the action of the valve 19 passes out through the discharge pipe 20.

In place of the diaphragm 3 a piston in a suitable tube may be used which is connected with the sliding rod 4.

The mode of action of the electric heater for liquids described above is as follows.

The space enclosed by the casing 1, in which there are the heaters (elements) 9 is always filled with water which rests on the arched bottom 14. The tap water flowing into the inlet pipe 13 or 18 fills the space in the casing 1 lying beneath the diaphragm 3 and can be conducted through the channel 16 over the arched bottom into the upper chamber of the casing 1. If the discharge pipe 12 or 20 is now open the water pressure beneath the diaphragm 3 is greater than that above the arched bottom 14, and the diaphragm 3 arches upwards. By this the sliding rod 4 is moved upward and the electric circuit is closed by closing the contactors 7, 10, by which the electric elements 9 are switched on. The back-spring 2 is also placed under compression by the movement of the sliding rod 4. When the discharge pipe 12 or 20 is closed the water pressure below and above the diaphragm 3 is equalized. The diaphragm with the sliding rod 4 passes back into its position of rest and in that way decompresses the back spring 8 and the two contactors 7, 10, which interrupt the supply of electric current to the elements 9.

I claim:—

1. An electric heater for liquids comprising, in combination, a container, partitions dividing said container into three compartments, fixed electric contacts mounted in one end compartment, a heating coil disposed in the middle compartment, a discharge outlet from the middle compartment, a vertical tubular guide member in said middle compartment, a reciprocable rod mounted in said guide member, a cross bar carried by the upper end of said rod, said cross bar being electrically connected with the heating coil, contacts carried by said cross bar, said contacts being positioned for contacting with the fixed contacts, an arched bottom to the middle compartment, a flexible diaphragm in the bottom compartment beneath said arched bottom in a disc member carried by the lower end of the reciprocable rod, an inlet for cold water in the bottom compartment, a by-pass tube between the middle and bottom compartments, means for throttling said by-pass tube, water entering the bottom compartment upwardly flexing the diaphragm into the arched bottom contacting with the disc member moving the rod to close the heater circuit and a spring for breaking the heater circuit, the inlet of water ceasing.

2. An electric heater for liquids as claimed in claim 1 including an overflow tube connected with bottom and middle compartments mounted on the exterior of the container, a threaded hole in said tube and a valve screwing into said threaded hole for regulating the passage through said tube.

CORNELIUS CANTÉ.